US008700668B2

United States Patent
Vasey

(10) Patent No.: US 8,700,668 B2
(45) Date of Patent: Apr. 15, 2014

(54) COMPLETENESS IN DEPENDENCY NETWORKS

(75) Inventor: Philip Edgar Vasey, Histon (GB)

(73) Assignee: Business Integrity Limited, London (GB)

( * ) Notice: Subject to any disclaimer, the term of this patent is extended or adjusted under 35 U.S.C. 154(b) by 1313 days.

(21) Appl. No.: 11/466,152

(22) Filed: Aug. 22, 2006

(65) Prior Publication Data

US 2007/0050383 A1 Mar. 1, 2007

Related U.S. Application Data

(60) Provisional application No. 60/710,727, filed on Aug. 23, 2005.

(51) Int. Cl.
*G06F 7/00* (2006.01)
*G06F 17/30* (2006.01)

(52) U.S. Cl.
USPC .......................................... 707/793; 707/810

(58) Field of Classification Search
USPC ......... 707/100, 791, 793, 795, 803, 790, 792, 707/804, 810, 999.102, 999.103; 715/231
See application file for complete search history.

(56) References Cited

U.S. PATENT DOCUMENTS

| 6,873,992 | B1 * | 3/2005 | Thomas ................................ 1/1 |
| 7,324,949 | B2 * | 1/2008 | Bristol ............................. 705/3 |
| 2004/0060005 | A1 * | 3/2004 | Vasey ............................ 715/513 |
| 2005/0050464 | A1 * | 3/2005 | Vasey ............................ 715/517 |
| 2005/0246415 | A1 * | 11/2005 | Belfiore et al. ............... 709/203 |
| 2006/0059423 | A1 * | 3/2006 | Lehmann et al. ............. 715/530 |

* cited by examiner

*Primary Examiner* — Usmaan Saeed
*Assistant Examiner* — Md. I Uddin
(74) *Attorney, Agent, or Firm* — Anderson Gorecki & Rouille LLP

(57) ABSTRACT

The invention improves document generation systems in which data is collected to enable automated, customised document generation. initially, a questionnaire which defines a dataset is completed. The system then determines which variables are relevant, and then determines whether all relevant variables are in the dataset. Finally, the system generates a fully customised document if the dataset is complete.

6 Claims, 5 Drawing Sheets

| Condition | Dataset | Evaluation |
|---|---|---|
| Gender = "Female" | | indefinite |
| Gender = "Female" | Gender = "Female" | true |
| Gender = "Female" | Gender = "Male" | false |
| Age >= 65 | | indefinite |
| Age >= 65 | Age = 70 | true |
| Age >= 65 | Age = 65 | true |
| Age >= 65 | Age = 60 | false |

Figure 6

| Condition | Dataset | Evaluation |
|---|---|---|
| not ( Gender = "Female" ) | | indefinite |
| not ( Gender = "Female" ) | Gender = "Female" | false |
| not ( Gender = "Female" ) | Gender = "Male" | true |
| not (Age >= 65 ) | | indefinite |
| not (Age >= 65 ) | Age = 70 | false |
| not (Age >= 65 ) | Age = 65 | false |
| not (Age >= 65 ) | Age = 60 | true |

Figure 7

| Condition | Dataset | Evaluation |
|---|---|---|
| Gender = "Male" and Age >= 65 | | indefinite |
| Gender = "Male" and Age >= 65 | Gender = "Male" | indefinite |
| Gender = "Male" and Age >= 65 | Age = 70 | indefinite |
| Gender = "Male" and Age >= 65 | Gender = "Male" <br> Age = 70 | true |
| Gender = "Male" and Age >= 65 | Gender = "Male" <br> Age = 65 | true |
| Gender = "Male" and Age >= 65 | Gender = "Male" <br> Age = 60 | false |
| Gender = "Male" and Age >= 65 | Gender = "Female" <br> Age = 70 | false |
| Gender = "Male" and Age >= 65 | Gender = "Female" <br> Age = 65 | false |
| Gender = "Male" and Age >= 65 | Gender = "Female" <br> Age = 60 | false |

Figure 8

| Condition | Dataset | Evaluation |
|---|---|---|
| Gender = "Male" or Age >= 65 | | indefinite |
| Gender = "Male" or Age >= 65 | Gender = "Male" | true |
| Gender = "Male" or Age >= 65 | Age = 70 | true |
| Gender = "Male" or Age >= 65 | Gender = "Male"<br>Age = 70 | true |
| Gender = "Male" or Age >= 65 | Gender = "Male"<br>Age = 65 | true |
| Gender = "Male" or Age >= 65 | Gender = "Male"<br>Age = 60 | true |
| Gender = "Male" or Age >= 65 | Gender = "Female"<br>Age = 70 | true |
| Gender = "Male" or Age >= 65 | Gender = "Female"<br>Age = 65 | true |
| Gender = "Male" or Age >= 65 | Gender = "Female"<br>Age = 60 | false |

Figure 9

| Dependency Network | Dataset | Variable | Relevant |
|---|---|---|---|
| Figure 1 | | Gender | yes |
| | | Pregnant | yes |
| Figure 1 | Gender = "Female" | Gender | yes |
| | | Pregnant | yes |
| Figure 1 | Gender = "Female"<br>Pregnant = "False" | Gender | yes |
| | | Pregnant | yes |
| Figure 1 | Gender = "Male" | Gender | yes |
| | | Pregnant | no |
| Figure 3 | | Company Type | yes |
| | | Director | yes |
| | | Age | yes |
| | | Enforced Retirement | yes |
| Figure 3 | Company Type = "LLP" | Company Type | yes |
| | | Director | no |
| | | Age | no |
| | | Enforced Retirement | no |
| Figure 3 | Company Type = "PLC"<br>Director = "False"<br>Age = 75 | Company Type | yes |
| | | Director | yes |
| | | Age | yes |
| | | Enforced Retirement | no |

Figure 10

| Dependency Network | Dataset | Complete | Relevant but Missing |
|---|---|---|---|
| Figure 1 | | no | Gender |
| Figure 1 | Gender = "Female" | no | Pregnant |
| Figure 1 | Gender = "Female" Pregnant = "False" | yes | |
| Figure 1 | Gender = "Male" | yes | |
| Figure 3 | | no | Company Type |
| Figure 3 | Company Type = "LLP" | yes | |
| Figure 3 | Company Type = "PLC" Director = "False" Age = 75 | yes | |
| Figure 3 | Company Type = "PLC" Director = "True" | no | Age |
| Figure 3 | Company Type = "PLC" Director = "True" Age = 75 | no | Enforced Retirement |

COMPLETENESS IN DEPENDENCY NETWORKS

CLAIM OR PRIORITY

Applicant claims priority to provisional application Ser. No. 60/710,727 filed Aug. 23, 2005.

FIELD OF THE INVENTION

The present invention relates to the collection of data. The present invention may be applied in particular to systems capable of generating customised documents in which data is collected to enable a customised document to be generated.

BACKGROUND OF THE INVENTION

There are innumerable applications which require the collection of data. For example, one particular area of interest is the creation of customised documents from document templates. A document template contains those parts of the document which are common to all documents generated from the templates. The template also comprises various portions of document content (such as text or images) whose inclusion in the final document depends on particular information. The final content of a completed document will therefore depend on certain pieces of relevant information which needs to be collected. For example, in a legal contract it is usually necessary to include a clause which specifies the law governing the contract and the particular wording of this clause will depend on the jurisdiction involved (such as 'England and Wales', 'Scotland' or 'Japan'). It is therefore necessary to determine the relevant jurisdiction before a completed document can be generated. Once the jurisdiction is determined, the appropriate clause wording is inserted into the document template at the appropriate position to create a partially customised document. Once all further relevant information is known, a fully customised document can be generated by inserting all the necessary portions of document content.

Sometimes, certain information may be relevant and need to be collected in some cases but not relevant in other cases. For example, in the above example of a legal contract, where the jurisdiction is Japan, the document may be required to specify to which court (such as 'Tokyo' or 'Kyoto') legal proceedings should be brought. In this case, the completed document can only be generated if this further piece of information is known. However, if the jurisdiction is not Japan, then this information is not relevant and is not required to generate a completed document.

The collection of data is often performed using a questionnaire. For example, in an electronic document generation system a user may be prompted to answer various questions presented on a user interface by typing information into text boxes, by selecting buttons and so on. In some systems the questionnaire may be arranged so that those questions which are not relevant are indicated as such. For example, those questions that are not relevant may be 'greyed out' so that the user is unable to input any data for those questions. In the above example, where the user has indicated in a previous question that the jurisdiction is 'England and Wales' or 'Scotland' the question relating to the Japanese court is greyed out since this question is not relevant.

When data collection is required, it is often important to ensure that all relevant information has been properly collected. In the above example, it is important that all relevant information has been collected to ensure that the resulting legal contract is complete. If certain information was missing, this could render the contract invalid or ineffective. In cases where the relevance of a piece of information depends on other pieces of information it can be extremely difficult to determine whether all relevant information has been collected.

In the case of the generation of official documents such as legal documents, previously it has been necessary for an expert such as a lawyer to review the final document to ensure that the documents are complete and contain all the relevant information. However, this approach is expensive and time consuming. Also, if an expert is not available, it may not be possible to generate a final document with a high degree of certainty that the document contains all relevant information.

The present invention addresses the problems set out above.

BRIEF DESCRIPTION OF THE FIGURES

FIG. 6 shows a table of examples of comparisons between conditions and the dataset and the result of each comparison;

FIGS. 7, 8 and 9 show tables giving several examples of the evaluation of conditions involving the 'not', 'and' and 'or' operators;

FIG. 10 shows a table illustrating whether the variables of the networks shown in FIGS. 1 and 2 are relevant or not given various datasets; and FIG. 11 shows a table illustrating whether various datasets are complete or not.

DETAILED DESCRIPTION OF PREFERRED EMBODIMENTS

Figure 1:
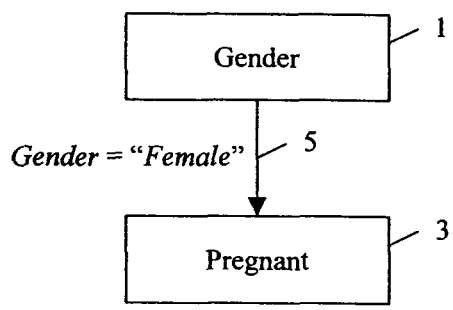
FIGS. 1, 2 and 3 show three examples of well-formed dependency networks.

The embodiment of the invention described below is in the form of a document generation system for generating customised documents using document templates. The system comprises an electronic questionnaire used to gather information which is used to generate a fully customised document. The questionnaire is implemented as a web page created using HTML displayed on a suitable computer system and is completed by a user by inputting various information in response to a series of questions presented on a display. The user may input information using suitable input devices for example by typing text into text boxes, by selecting buttons corresponding to different options and by any other suitable means. The user may also navigate forwards and backwards through the questionnaire amending their answers to the questions. The software necessary to run the questionnaire may be stored on any suitable storage device or medium, which software is retrieved and executed by a processor when required. In some embodiments, the questionnaire web page may be accessed independently from several computers connected together by a network. This allows different users to complete different parts of the questionnaire more easily. In some embodiments, the information required to answer some questions may be provided from a database or other information source. Examples of electronic questionnaires used to collect information are known to those skilled in the art.

The information which needs to be collected in the described embodiment relates to a set of data variables. Each question in the questionnaire is associated with a variable and the user's answer to a particular question assigns a value to the associated variable. For example, a first question in the questionnaire may request information relating to the gender of a person. In this case, 'gender' may be regarded as a variable which may take one of two values, 'male' or 'female' depending on the user's answer to the first question. A second question may request information relating to whether the person is pregnant or not. In this case 'pregnant' may be regarded as a data variable which may take one of two values, 'true' or 'false' depending on the user's answer to the second question. As the user answers further questions, the values are assigned to further variables. A collection of variables, each having a value assigned to it may be referred to as a dataset. Once the user has completed the questionnaire, those variables which have been assigned a value form a dataset. It is understood that the phrase 'completing a questionnaire' does not require that every question be answered.

When the questionnaire is completed, a customised document may be generated using the information collected by the questionnaire. The document generation process involves selectively inserting portions of document content at particular locations in a document template depending on the information collected. Examples of document generation systems are described in earlier U.S. patent application Ser. No. 10/347,785, incorporated herein by reference and earlier U.S. patent application Ser. No. 10/932,266, incorporated herein by reference.

The dataset does not necessarily contain all possible variables since those variables corresponding to questions not answered will not be assigned a value and so would not be included in the dataset. A question may not have been answered for several reasons. For example, if the user had answered the question relating to gender by indicating 'male', thereby assigning the value 'male' to the variable gender, then the question relating to pregnancy would have been irrelevant. In this case, the question relating to pregnancy would have been greyed out, preventing the user from providing an answer to this question, so that the variable gender would not have been assigned a value and would not be included in the dataset. Some questions may not have been answered for other reasons. For example, the user may have failed to answer one or more of the questions due to error or because the user did not know the answer to those questions. Accordingly, the variables associated with those questions not answered would not have been assigned values and so will not be included in the dataset.

In the first case where certain questions are not answered due to their irrelevance, a fully customised document may still be generated since the only variables that are missing from the dataset are irrelevant ones. In this case the dataset contains all relevant information necessary to generate a complete document. In the second case where certain questions are not answered due to error or because the answer to those questions are not known, some relevant variables may be missing from the dataset. In this case there may be insufficient information to generate a complete document.

The present invention provides a system and method for determining whether all necessary variables are included in the dataset. In other words, the present invention provides a method to determine whether all relevant information has been collected so that a fully customised document can be generated. In the described embodiment, the dependency relationship between the variables is represented by a dependency network. As discussed in greater detail below, the system then determines whether each variable in the network is relevant or not relevant according to a rule. Finally, the system determines whether all relevant variables are included in the dataset.

A dependency network consists of nodes representing the data variables and directed arcs between the nodes. The node at the 'target' end of the arc represents the dependent variable and the nodes at the 'source' end of the arc represent the controlling variables. The arc represents the conditions that relate the dependent variable back to the controlling variables. In particular, the condition represented by an arc is a condition involving the variables represented by the source nodes that needs to be satisfied for the variable represented by the target node to be relevant. An arc representing a condition may be said to be tagged with that condition.

Figure 2:
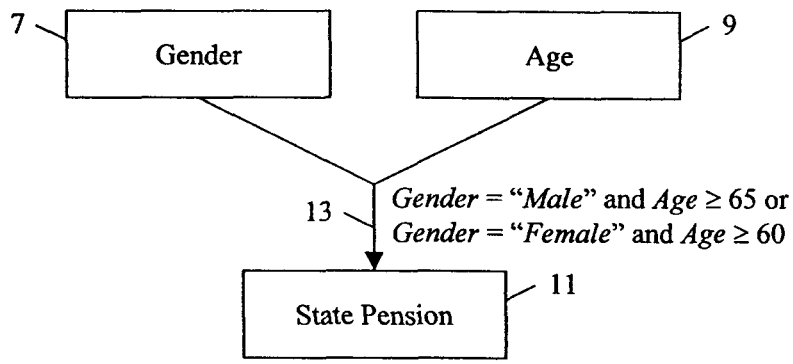
Figure 3:
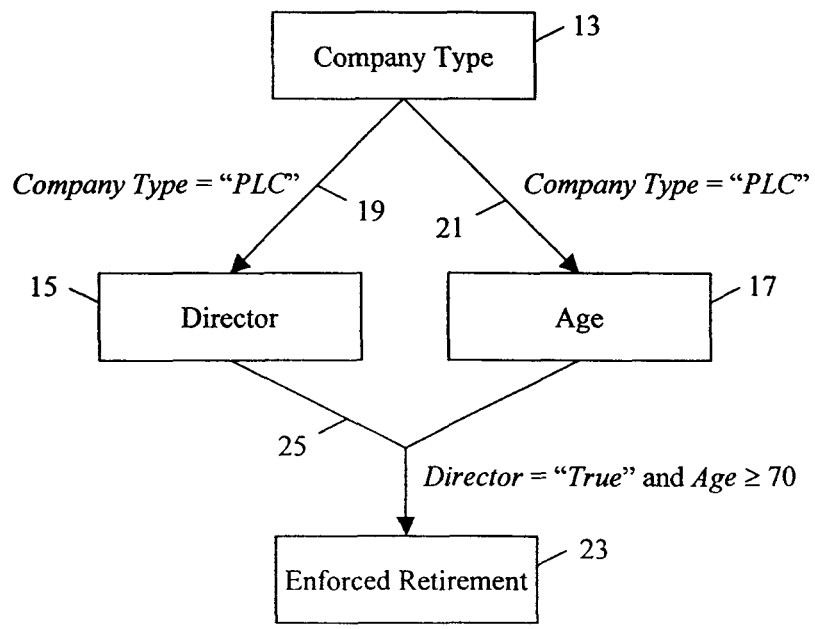

Three examples of dependency networks are shown in FIGS. 1, 2 and 3 respectively. The dependency network shown in FIG. 1 comprises a first node 1 representing the controlling variable 'gender' and a second node 3 representing the dependent variable 'pregnant'. An arc 5 connecting the first and second nodes 1, 3 represents the condition gender='female'.

The dependency network shown in FIG. 2 is one in which an arc has more than one source node. This network comprises first and second nodes 7, 9 representing the controlling variables 'gender' and 'age' and a third node 11 representing the dependent variable 'state pension'. An arc 13 connecting the first and second nodes 7, 9 to the third node 11 represents the condition (gender="male" and age ≥65) or (gender="female" and age ≥60).

The dependency network shown in FIG. 3 is one comprising multiple arcs. This network comprises a first node 13 representing the controlling variable 'company type' and second and third nodes 15, 17 representing the dependent variables 'director' and 'age'. A first arc 19 connects the first node 13 and the second node 15, and a second arc 21 connects the first node 13 and the third node 17. The first and second arcs 19, 21 each represent the condition company type="plc". In addition, the network of FIG. 3 comprises a fourth node 23 representing the dependent variable 'enforced retirement'. A third arc 25 representing the condition director="true" and age ≥70 connects the second and third nodes 15, 17 with the fourth node 23. The second and third nodes are source nodes as well as target nodes and so represent controlling variables as well as dependent variables.

A dependency network may be said to be well-formed if, and only if the following condition is satisfied:

For every arc which involves two or more source nodes, either:
  (i) none of the source nodes are themselves target nodes of arcs, or
  (ii) all of the source nodes are target nodes of other arcs, and all those arcs are tagged with the same condition.

Figure 4:
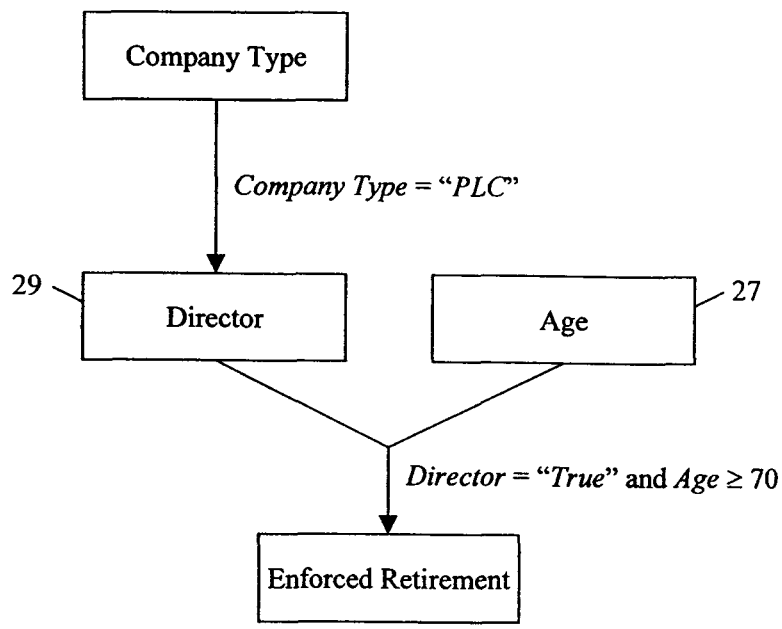
FIGS. 4 and 5 show two examples of dependency networks that are not well-formed.
Figure 5:
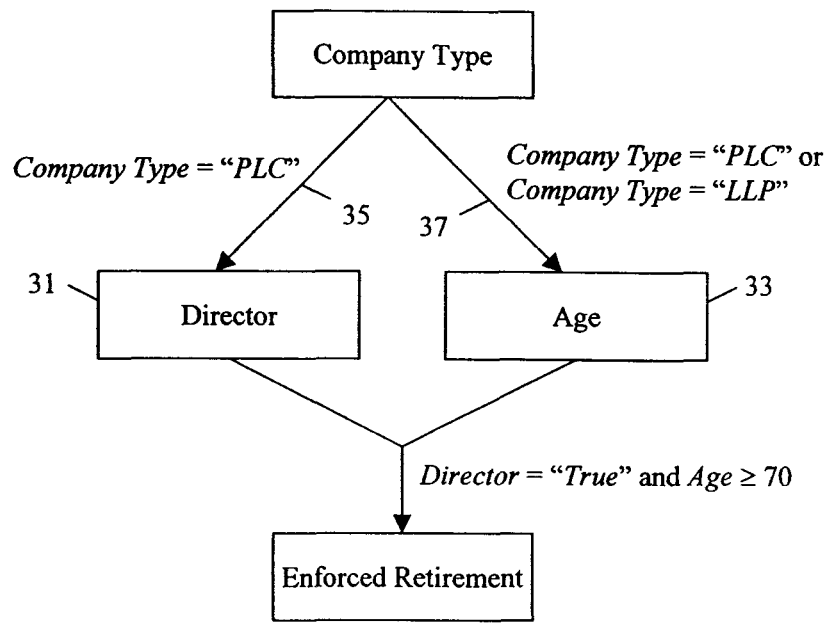

The dependency networks shown in FIGS. 1, 2 and 3 are all well-formed. FIGS. 4 and 5 show examples of dependency networks which are not well formed. For example, the network shown in FIG. 4 is not well formed because the node 27 representing the variable 'age' is not a target node of any arc, whereas node 29 representing the variable 'director' is a target node. The network shown in FIG. 5 is not well-formed because the node 31 representing the variable 'director' is not subject to the same condition as the node 33 representing the variable 'age' because the arcs 35 and 37 are tagged with different conditions.

By applying the condition that the dependency networks are well-formed, this ensures that the dependency network is meaningful. Dependency networks which are not well-formed would involve conditions which in some situations depend on variables which are relevant and variables which are not relevant. Such a condition would not be meaningful.

In order to evaluate the conditions represented by the arcs, the following definitions are provided.

Given a dataset, the evaluation of a condition represented by an arc is a three-valued logic. A condition is true if enough variables are in the dataset to definitely conclude the condition is true. A condition is false if enough variables are in the dataset to definitely conclude the condition is false. Otherwise, a condition is indefinite because one or more significant variables are not in the dataset.

The result of a comparison is indefinite if the dataset does not contain a value for the variable. The result is true if the dataset contains a value for the variable and the comparison holds. The result is false if the dataset contains a value for the variable but the comparison does not hold. FIG. 6 shows a table of examples of comparisons and the result of each comparison given a particular dataset.

Conditions may involve several variables combined together using the logical operators 'not', 'and' and 'or'. In the case of the operator 'not', the result is indefinite if the negated component is itself indefinite, the result is true if the negated component evaluates to false, and the result is false if the negated component evaluates to true. FIG. 7 shows a table giving several examples of the evaluation of conditions involving the 'not' operator.

In the case of the operator 'and', the result is indefinite if some or all of the individual components evaluate to indefinite, and all the others evaluate to true. The result is true if all of the individual components evaluate to true and the result is false if at least one of the individual components evaluates to false. FIG. 8 shows a table giving several examples of the evaluation of conditions involving the 'and' operator.

In the case of the operator 'or', the result is indefinite if some or all of the individual components evaluate to indefinite, and all the others evaluate to false. The result is true if at least one of the individual components evaluate to true and the result is false if all of the individual components evaluates to false. FIG. 9 shows a table giving several examples of the evaluation of conditions involving the 'or' operator.

The above operators may be used to form more complex conditions by combining simpler sub-conditions in the usual way with logical operators.

Given a well-formed dependency network and a dataset, a variable is defined as relevant if, and only if:
  (i) the variable is not the target node of any arcs, or
  (ii) it is the target node of an arc, and all the source node variables are relevant, and the conditions do evaluate to true or indefinite.

FIG. 10 shows a table illustrating whether, according to the above rule, the variables of the networks shown in FIGS. 1 and 2 are relevant or not given various datasets.

Given a well-formed dependency network, a dataset is defined as complete if, and only if all relevant variables are in the dataset. FIG. 11 shows a table illustrating whether, according to the above rule, various datasets are complete or not. The table of FIG. 11 also indicates where a dataset is not complete by listing those variables which are missing from the dataset.

Once the questionnaire has been completed, the system determines, using the rules described above, whether each variable is relevant or not relevant. Due to the dependencies between variables, whether a particular variable is relevant will depend on the values, if any, assigned to other variables. Then, the system determines whether the dataset produced from the questionnaire is complete or not by determining whether all relevant variables are in the dataset. The user may then be provided with a visual or other indication as to whether or not the information provided from the questionnaire is sufficient to generate a fully customised document. In one embodiment a flag is set to either a value 1 or 0 depending on whether the dataset is complete or incomplete. The system may then use the status of the flag as an indication of completeness. If the dataset is complete a fully customised document containing all relevant information is generated. If the dataset is not complete then only a partially customised document may be generated.

The invention claimed is:

1. A computer program stored on a non-transitory computer-readable medium for automated customized document generation where inclusion of document content of a template is based on evaluation of rules, the rules being evaluated using values assigned to content variables of the template, wherein the values are based on responses to questions of a questionnaire, comprising:
   logic which, for each question of the questionnaire for which a response is received, determines a value based on the response and assigns the value to a corresponding content variable of the template associated with the question;
   logic which, after the questionnaire has been completed, and where received responses are insufficient to evaluate all rules, determines:
   which content variables of the template are relevant; and
   whether all relevant content variables of the template are in the dataset of content variables for which values have been assigned, including:
     that the variables form a well-formed dependency network wherein the dependency network is said to be well-formed if, and only if, the following condition is satisfied:
     for every arc which involves two or more source nodes, either:
       (i) none of the source nodes are themselves target nodes of arcs, or
       (ii) all of the source nodes are target nodes of other arcs, and all those arcs are tagged with same condition;
     wherein each node represents a variable and each arc represents a connection between source nodes and target nodes; and
   given the well-formed dependency network and the dataset, the variable is defined as relevant if, and only if:
     (i) the variable is not the target node of any arcs, or
     (ii) it is the target node of an arc, and all the source node variables are relevant, and the conditions do evaluate to true or indefinite; and
   wherein a dataset is defined as complete if, and only if, all relevant variables are in the dataset and indicating where a dataset is not complete by listing those variables which are missing from the dataset; and
   logic which generates a fully customized document from the template if it is determined that all relevant content variables of the template are in the dataset.

2. The computer program of claim 1 including using the values of the variables to determine which items of information are incorporated into a customised document.

3. The computer program of claim 2 including generating the customised document which is a legal document.

4. A method for producing a customised document for which inclusion of document content of a template is based on evaluation of rules, the rules being evaluated using values assigned to content variables of the template, wherein the values are based on responses to questions of a questionnaire, comprising the steps of:
   completing a questionnaire to define a dataset of content variables for which values have been assigned;

determining which content variables of the template are relevant;

determining whether all relevant variables of the template are in the dataset, including:

determining that the variables form a well-formed dependency network wherein the dependency network is said to be well-formed if, and only if, the following condition is satisfied:

for every arc which involves two or more source nodes, either:

(i) none of the source nodes are themselves target nodes of arcs, or (ii) all of the source nodes are target nodes of other arcs, and all those arcs are tagged with same condition;

wherein each node represents a variable and each arc represents a connection between source nodes and target nodes; and given the well-formed dependency network and the dataset, the variable is defined as relevant if, and only if:

(i) the variable is not the target node of any arcs, or (ii) it is the target node of an arc, and all the source node variables are relevant, and the conditions do evaluate to true or indefinite; and wherein a dataset is defined as complete if, and only if, all relevant variables are in the dataset and indicating where a dataset is not complete by listing those variables which are missing from the dataset; and where received responses are insufficient to evaluate all rules, generating a fully customised document if all relevant variables of the template are in the dataset.

5. The method of claim 4 including using the values of the variables to determine which items of information are incorporated into a customized document.

6. The method of claim 5 including generating the customized document which is a legal document.

\* \* \* \* \*